United States Patent [19]

Furukawa

[11] Patent Number: 4,613,144
[45] Date of Patent: Sep. 23, 1986

[54] STEERING SYSTEM FOR VEHICLES

[75] Inventor: Yoshimi Furukawa, Saitama, Japan

[73] Assignee: Honda Giken Kogyo Kabushiki Kaisha, Tokyo, Japan

[21] Appl. No.: 659,321

[22] Filed: Oct. 10, 1984

[30] Foreign Application Priority Data

Oct. 17, 1983 [JP] Japan ................................ 58-193662

[51] Int. Cl.$^4$ .............................................. B62D 7/00
[52] U.S. Cl. ......................................... 280/91; 280/96
[58] Field of Search ........................... 28/91, 96, 707; 180/140, 141, 142; 74/571 L, 831, 834, 836

[56] References Cited

U.S. PATENT DOCUMENTS 4,185,845 1/1980 Misch et al. .................. 280/707
4,313,514 2/1982 Furukawa et al. ............... 280/91

FOREIGN PATENT DOCUMENTS 26363 2/1984 Japan.

Primary Examiner—John J. Love
Assistant Examiner—Ross Weaver
Attorney, Agent, or Firm—Irving M. Weiner; Joseph P. Carrier; John J. Cantarella

[57] ABSTRACT

A steering system for vehicles in which the steered angle ratio of a rear wheel (20) to a front wheel (7) is controllable in accordance with the vehicle speed.

The steering system is improved by providing a signal variation moderating device (34) for moderating the variation of a vehicle speed signal (u), so that even in a sudden change of the vehicle speed, the steered angle ratio is allowed to be moderate in the correction thereof.

The signal variation moderating means may be an integral circuit or a delay circuit.

3 Claims, 8 Drawing Figures

STEERING SYSTEM FOR VEHICLES

BACKGROUND OF THE INVENTION

1. Field of the Invention

The present invention relates to a steering system for vehicles of the type in which a rear wheel is steerable in relation to the steering operation of a front wheel, and more particularly, to a steering system for vehicles in which the steered angle ratio of a rear wheel to a front wheel is variable in accordance with the vehicle speed.

2. Description of Relevant Art

There has already been proposed a steering system for vehicles, in which the steered angle ratio of a rear wheel to a front wheel is variable in accordance with the vehicle speed, and more particularly, in which the rear wheel is steered, at relatively low vehicle speeds, in the opposite direction to the front wheel or substantially at an angle of zero degree and, at relatively high vehicle speeds, in the same direction as the front wheel, as shown in FIG. 6 of the accompanying drawings. (Japanese Laid Open application No. JP-A-59-26363 dated Feb. 10, 1984).

In such a steering system, as the vehicle speed is decreased with a steering wheel held at a constant steering angle when the vehicle is turning at a high speed in a steering mode in which a rear wheel is steered in the same direction as a front wheel, the steered angle of the rear wheel correspondingly decreases, resulting in a varying difference between the steered angles of the front and rear wheels, whereby the turning radius of the vehicle becomes smaller.

Incidentally, most ordinary vehicles with an unsteerable rear wheel are set so as to have what is called an understeer characteristic which, as the vehicle speed is increased with a steering wheel held at a constant steering angle to raise the stability in high-speed travelling, enlarges the turning radius. Also, in such an ordinary vehicle with an understeer characteristic, the turning radius becomes smaller as the vehicle speed is decreased while the vehicle is turning.

However, in those vehicles equipped with a steering system in which the steered angle ratio of a rear wheel to a front wheel is variable in accordance with the vehicle speed, such an understeer characteristic appears to be more effective than in the ordinary vehicle in which the rear wheel is unsteerable. As a result, when increasing and decreasing the vehicle speed while turning, the driver has to make a corresponding correction of the handling operation of a steering wheel by a larger degree than in the ordinary vehicle. Particularly in the case where such acceleration or deceleration is effected suddenly, the degree of correction becomes large.

With such point in mind, the present invention has been achieved to provide an improvement in a steering system for vehicles of the above-mentioned type.

SUMMARY OF THE INVENTION

According to the present invention, there is provided in a steering system for vehicles including a steering wheel, a front wheel, a front steering means for steering the front wheel, a rear wheel, a rear steering means for steering the rear wheel, a ratio changing means for changing the steered angle ratio of the rear wheel to the front wheel, a control means for controlling the ratio changing means, a ratio detecting means for detecting the steered angle ratio, the ratio detecting means cooperating with the control means, a speed detecting means for detecting the vehicle speed, and the speed detecting means cooperating with the control means. The rear wheel is steered at relatively low vehicle speeds in the opposite direction to the front wheel or substantially at an angle of zero degree and at relatively high vehicle speeds in the same direction as the front wheel. The improvement according to the invention comprises the control means having a signal variation moderating means for moderating the variation of a vehicle speed signal from the speed detecting means, so that the steered angle ratio is moderately corrected even when the vehicle speed is suddenly changed.

Accordingly, an object of the present invention is to provide a steering system for vehicles, in which, even when the vehicle speed is suddenly changed, the steering angle of a steering wheel is not required to be corrected to any great extent, thereby achieving a favorable facilitation of the steering operation.

The above and further features, objects and advantages of the present invention will become apparent from the following detailed description of the preferred embodiment of the invention when the same is read in conjunction with the accompanying drawings.

DETAILED DESCRIPTION OF PREFERRED EMBODIMENTS

Figure 1:
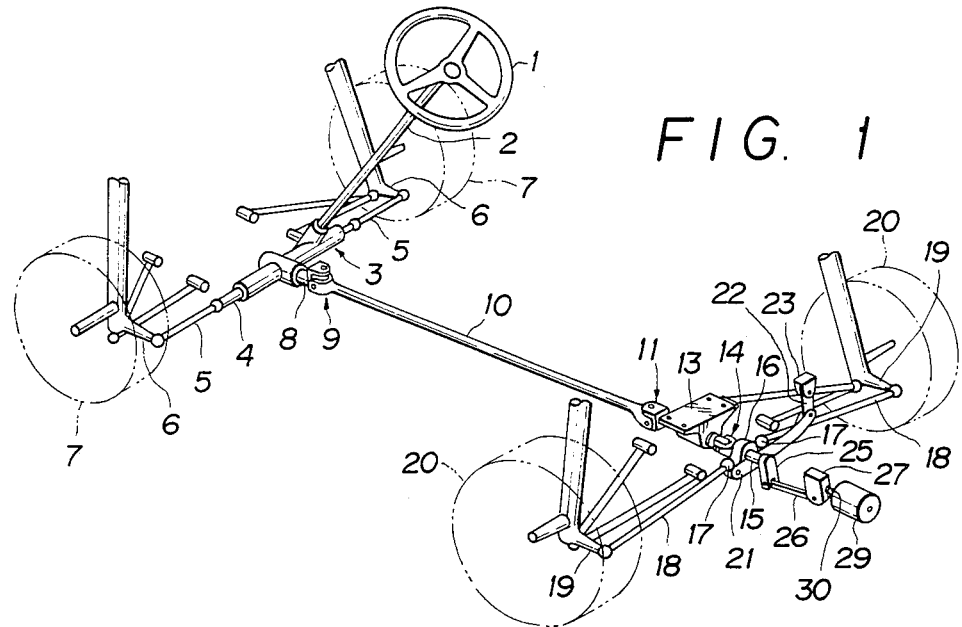
FIG. 1 is a schematic perspective view showing a basic structure of a vehicle equipped with a steering system according to the preferred embodiment of the invention.
Figure 2:
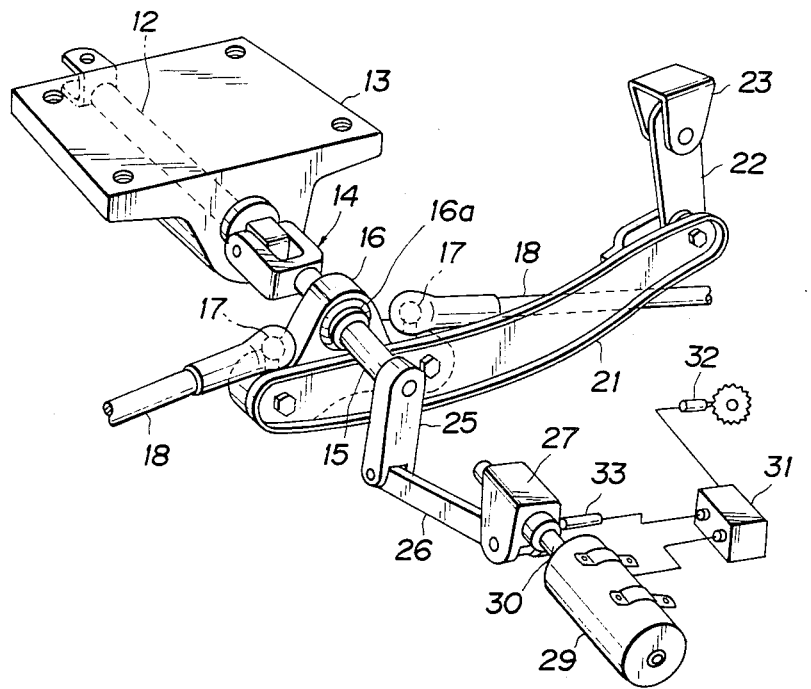
FIG. 2 is an enlarged perspective view of a rear wheel steering mechanism of the steering system of FIG. 1.

There will be described hereinbelow a steering system for vehicles according to the preferred embodiment of the invention, which includes a basic steering system substantially equivalent to that of the known steering system described hereinabove. FIGS. 1 and 2 show the arrangement of the basic steering system, the function of which will be described in detail hereinbelow in conjunction with FIGS. 3a to 3c.

Referring first to FIG. 1, designated at reference numeral 1 is a steering wheel. The steering wheel 1 is fastened to the upper end of a steering shaft 2 assembled at the lower end thereof in a gearbox 3 of a rack and pinion type, which has a rack shaft 4 connected at each transverse end thereof through one of a pair of tie rods 5, 5 to one of a pair of knuckle arms 6, 6 each respectively supporting one of a pair of front wheels 7, 7, to be steered in the same steering direction as the steering wheel 1, whereby a known front-wheel steering mechanism is constituted.

The gearbox 3 further has a pinion shaft 8 rearwardly projected therefrom, the shaft 8 being connected at the rear end thereof through a universal joint 9 to the front end of a relatively long linkage shaft 10, which in turn is connected at the rear end thereof to a later-described input shaft of a rear-wheel steering mechanism, the input shaft extending along the longitudinal centerline of a vehicle body (not shown) and being rotatably supported by means of a bearing bracket 13 secured to the vehicle body. The rear end of the input shaft is connected through a bifurcated joint 14 to a swingable shaft 15 having at the longitudinally middle part thereof a joint member 16 loosely fitted thereon. The joint member 16 is connected at each transverse end thereof through one of a pair of ball joints 17, 17 to the inner end of one of a pair of tie rods 18, 18, while being transversely land vertically swingably suspended from the vehicle body by means of a pair of link plates 21, 22 supported by a bracket 23. The tie rods 18, 18 are each respectively connected at the outer end thereof to one of a pair of knuckle arms 19, 19 which support a pair of rear wheels 20, 20, respectively.

Referring now to FIG. 2, the swingable shaft 15 has, at the longitudinally intermediate part thereof, a rotary part 16a of the joint member 16 fixedly fitted thereon and, at the rear end thereof, an arm member 25 secured thereto at the upper end thereof so as to be kept perpendicular to the swingable shaft 15. To the lower end of the arm member 25 is pivotably connected the front end of a link 26, which in turn is pivotably connected at the rear end thereof to a slider 27 screw-feedably fitted, by means of a ball and screw mechanism 28 shown in FIGS. 3a to 3c, on an output shaft 30 of a control motor 29. The motor 29 is fixed to the vehicle body so that the output shaft 30 extends in alignment with the above-mentioned input shaft, which is designated at reference numeral 12 in FIG. 2.

Moreover, the vehicle has mounted thereon a microcomputer 31 adapted to receive data signals from both a vehicle speed sensor 32 for detecting the travelling speed of the vehicle and a slider position sensor 33 for detecting the screw-fed position of the slider 27, to thereby supply a proper control signal to the motor 29 in accordance with the vehicle speed.

In the above arrangement, a mechanism for changing the steered angle ratio of the rear wheels 20, 20 to the front wheels 7, 7 is constituted by the swingable shaft 15, the joint member 16, the arm member 25, the link 26, the slider 27, the motor 29, and the output shaft 30.

Figure 3A:
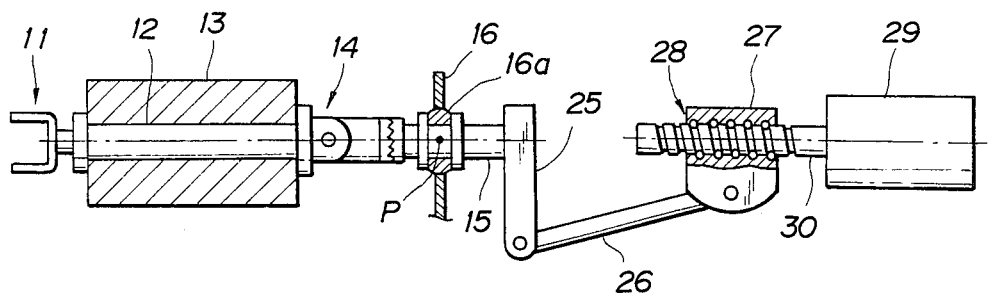
FIGS. 3a to 3c are longitudinal sectional side views, for functional explanation, of an essential part of the rear wheel steering mechanism of FIG. 2.
Figure 3B:
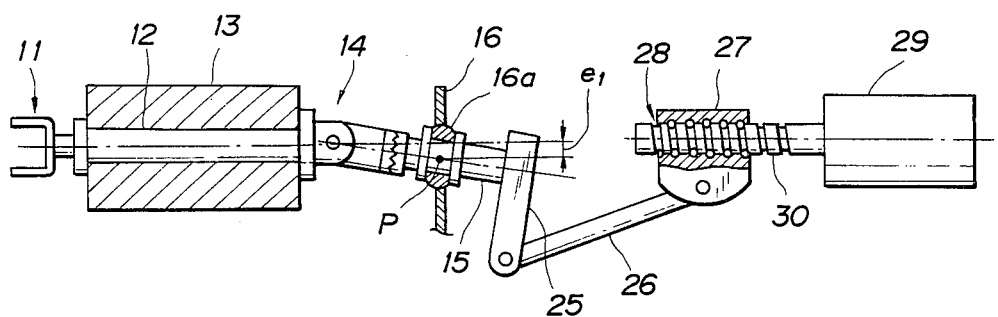
Figure 3C:
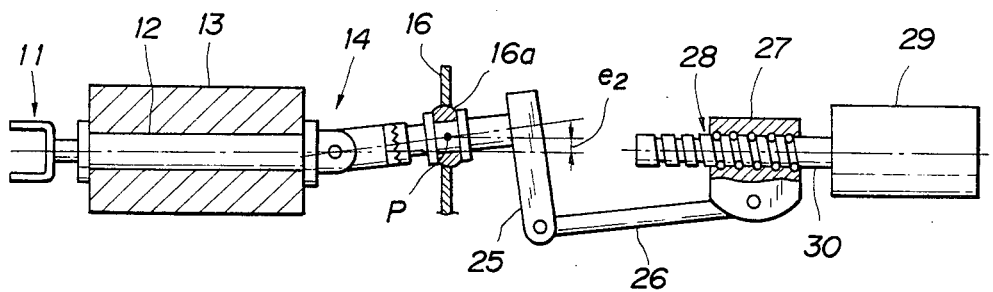

Referring now to FIGS. 3a to 3c, the steered angle ratio changing mechanism will be described below with respect to the function thereof.

Figure 6:
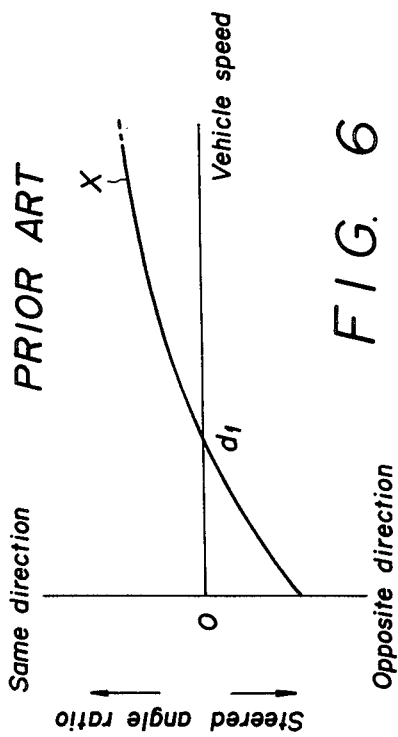
FIG. 6 is a graph showing a steered angle ratio characteristic between a front wheel and a rear wheel of a conventional steering system.

When the vehicle speed is equal to a predetermined reference speed $d_1$ shown in FIG. 6, the slider 27 is located at a position shown in FIG. 3a and hence the joint member 16 has a pivot point P thereof on the extension of the axis of the input shaft 12. In such case, the swingable shaft 15 is permitted to coaxially rotate with the input shaft 12, so that even when the swingable shaft 15 is rotated the joint member 16 will not laterally swing, thus being kept from actuating the left and right rear tie rods 18, 18. Accordingly, when operated, the steering wheel 1 will steer only the front wheels 7, 7, leaving the rear wheels 20, 20 substantially unsteered.

On the other hand, while the vehicle speed is lower than the reference speed $d_1$, the computer 31 receiving a corresponding signal from the vehicle speed sensor 32 makes a judgment, which causes the motor 29 to be controlled with respect to the number of revolutions thereof in response to the detected vehicle speed, whereby the slider 27 is advanced as shown in FIG. 3b from the position thereof in FIG. 3a. At such a low speed, the resultant advance of the slider 27 makes the swingable shaft 15 incline downwardly, thereby downwardly offsetting the pivot point P by a distance $e_1$ from the axis level of the input shaft 12. Accordingly, when operated, the steering wheel 1 causes the rotary part 16a of the joint member 16 to be laterally swung under a horizontal plane including the axis of the input shaft 12, thereby bringing the rear tie rods 18, 18 in the opposite direction to the front tie rods 5, 5, so that the rear wheels 20, 20 are steered oppositely to the front wheels 7, 7, while the steered angle ratio between the front and rear wheels 7, 7 and 20, 20 is substantially proportional to the offset distance $e_1$ which continuously varies depending on the vehicle speed.

To the contrary, while the vehicle speed is higher than the reference speed $d_1$, the computer 31 causes the motor 29 to be reversed in accordance with the vehicle speed, so that the slider 27 is retreated as shown in FIG. 3c from the position thereof in FIG. 3a. At such a high speed, the resultant retreat of the slider 27 makes the swingable shaft 15 incline upwardly, thereby upwardly offsetting the pivot point P by a distance $e_2$ from the axis level of the input shaft 12. Accordingly, when operated, the steering wheel 1 causes the rotary part 16a of the joint member 16 to be laterally swung under the horizontal plane including the axis of the input shaft 12, thereby bringing the rear tie rods 18, 18 in the same direction as the front tie rods 5, 5, so that the rear wheels 20, 20 are steered in the same direction as the front wheels 7, 7, while the steered angle ratio therebetween is substantially proportional to the offset distance $e_2$ which also continuously varies depending on the vehicle speed.

The computer 31 comprises a microcomputer system including, but not limited to, a plurality of integrated circuits (now shown) such as a CPU, a ROM, a RAM, and a plurality of peripheral interfaces.

According to such a basic steering system as above-described, at relatively low vehicle speeds a rear wheel is steered in the opposite direction to a front wheel, thus giving relatively small turning radii, and improving the vehicle turning characteristic, and at relatively high vehicle speeds it is steered in the same direction as the front wheel, thus improving the steering responsibility.

In the steering system according to the preferred embodiment of the invention, the computer 31 has a below-described integrator adapted to function as a vehicle speed signal variation moderating means for moderating sudden variations in a signal carrying data on the vehicle speed from the vehicle speed sensor 32.

Figure 4:
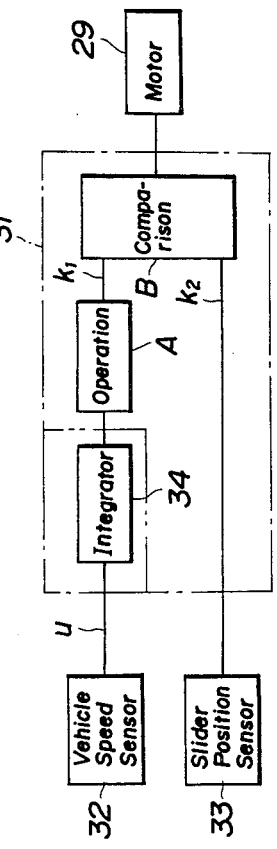
FIG. 4 is a functional block diagram of a control part of the steering system of FIGS. 1, 2, and 3a to 3c.

Referring now to FIG. 4, the signal carrying vehicle speed data from the vehicle speed sensor 32 is given as a speed data signal u. The speed data signal u is deprived of high-frequency components thereof, which represent sudden variations of the vehicle speed, at the above-mentioned integrator, which is designated at reference numeral 34, to obtain a moderately varying vehicle speed signal $u_1$ consisting of low-frequency components representing a corresponding moderate vehicle speed variation. The vehicle speed signal $u_1$ is processed by an operation function A to calculate a necessary steered angle ratio $k_1$, which in turn is compared through a comparison function B with a real-time steered angle ratio $k_2$ detected through the slider position sensor 33, to determine the degree of necessary correction of the steered angle ratio, which degree of necessary correction is output in the form of a correction command $b_1$ to the control motor 29 to properly move the slider 27. As a result, there is established a proper steered angle ratio of the rear wheels 20, 20 to the front wheels 7, 7. Such steered angle ratio is kept moderate in the correction thereof even when the vehicle speed is suddenly changed.

In the case where the actual change of vehicle speed is not sudden but moderate, the speed data signal u which is thus free of undesired high-frequency components simply passes the integrator 34 to enter, as it is, the operation function A, which provides a suitable steered angle ratio for the actual vehicle speed. Then, through the comparison function B, a suitable command is given to the control motor 29 in a manner similar to the above-described case.

The foregoing processes in the computer 31 are exercised by the following a control program stored in the ROM as a memory of the microcomputer system.

Figure 5:
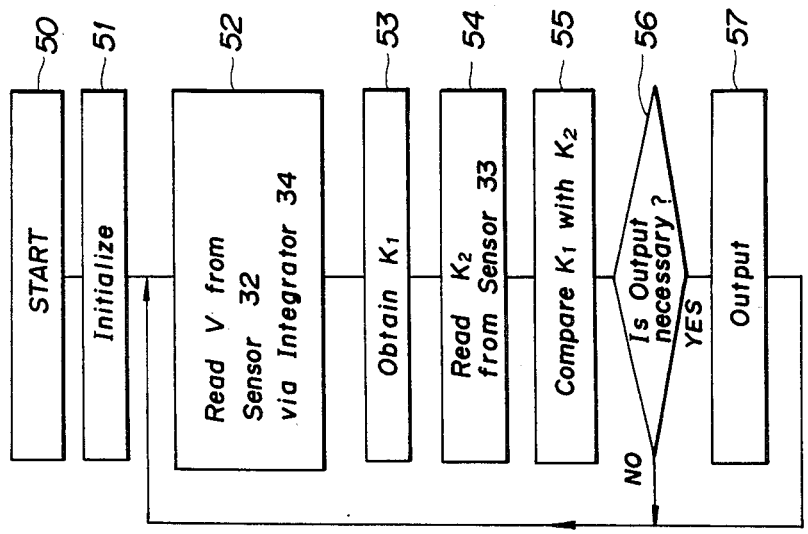
FIG. 5 is a schematic flowchart of a program for a microcomputer system of the control part of FIG. 4.

FIG. 5 is a flowchart showing the control program.

As seen from FIG. 5, the control program starts at a stage 50 when the control part of the steering system is powered on or reset, and goes to an initializing stage 51 for initializing peripheral devices to set necessary variables.

Then the program flow enters a base loop comprising a plurality of stages 52 to 57.

At the first stage 52 of the base loop, the speed data signal u is read from the vehicle speed sensor 32 through the integral circuit 34 to obtain the vehicle speed signal $u_1$ of moderate variation, before the flow enters a subsequent stage 53 in which a suitable steered angle ratio $k_1$ is determined in accordance with the vehicle speed signal $u_1$, while at a stage 54 next thereto an actual steered angle ratio $k_2$ is read from the slider position sensor 33. Then, at a stage 55, the steered angle ratios $k_1$ and $k_2$ are compared for a judgment in a decision stage 56 as to whether or not an output to the control motor 29 is necessary.

When, at the decision stage 56, the output to the motor 29 is judged necessary, then the correction command $b_1$ is output at the last stage 57 of the base loop to the motor 29, thereby moving the slider 27 to a proper position, to correct the actual steered angle ratio. On the other hand, when the output to the motor 29 is judged unnecessary at the stage 56 or when the stage 57 has its process completed, then the program flow goes to the stage 52.

As will be understood from the foregoing description, in a steering system according to the preferred embodiment of the invention, even when the vehicle speed is suddenly changed, the steered angle ratio of a rear wheel to a front wheel is not requried to be suddenly changed but is permitted to be moderate in the correction thereof, that is, it is permitted to be corrected depending on the vehicle speed change as delayed to be moderated. Thus, in a sudden increase or descrease of the vehicle speed while handling a steering wheel, the correction of the handling operation is not required to be quick but is allowed to be moderate as in the case of a moderate vehicle speed change in which the handling operation is quite easy.

Moreover, the present invention may be embodied as a steering system including front and rear wheels having hydraulically controlled steering in which information on the steered angle of the front wheel is hydraulically transmitted, or as a steering system in which the steered angle of a front wheel is directly informed to a computer by means of an electric signal. Particularly, it will be clear that a delay circuit may be employed in place of the integrator 34.

Although there have been described what are at present considered to be the preferred embodiments of the invention, it will be understood that the present invention may be embodied in other specific forms without departing from the spirit or essential characteristics thereof. The present embodiments are therefore to be considered in all respects as illustrative and not restrictive. The scope of the invention is indicated by the appended claims rather than by the foregoing description.

I claim:

1. In a steering system for vehicles including a steering wheel, a front wheel, front steering means for steering said front wheel, a rear wheel, rear steering means for steering said rear wheel, ratio changing means for changing the steered angle ratio of said rear wheel to said front wheel, control means for controlling said ratio changing means, ratio detecting means for detecting the steered angle ratio, said ratio detecting means cooperating with said control means, speed detecting means for detecting the vehicle speed, and said speed detecting means cooperating with said control means, in which said rear wheel is steered at relatively low vehicle speeds in the opposite direction to said front wheel or substantially at an angle of zero degree and at relatively high vehicle speeds in the same direction as said front wheel, the improvement comprising: said control means having signal variation moderating means for moderating the variation of a vehicle speed signal from said speed detecting means, so that the steered angle ratio is moderately corrected even when the vehicle speed is suddenly changed.

2. A steering system according to claim 1, wherein said signal variation moderating means comprises an integrator.

3. A steering system according to claim 1, wherein said signal variation moderating means comprises a delay circuit.

* * * * *

UNITED STATES PATENT AND TRADEMARK OFFICE
CERTIFICATE OF CORRECTION

PATENT NO. : 4,613,144
DATED : September 23, 1986
INVENTOR(S) : Yoshimi FURUKAWA It is certified that error appears in the above-identified patent and that said Letters Patent are hereby corrected as shown below:

Column 3, line 15 change "land" to ---and---.

Column 5, line 18 delete "the" (first occurrence).

Signed and Sealed this

Seventeenth Day of February, 1987

*Attest:*

DONALD J. QUIGG

*Attesting Officer*  *Commissioner of Patents and Trademarks*